United States Patent
Chakravarty et al.

(10) Patent No.: US 12,045,950 B2
(45) Date of Patent: Jul. 23, 2024

(54) OBJECT POSE ESTIMATION

(71) Applicant: Ford Global Technologies, LLC, Dearborn, MI (US)

(72) Inventors: Punarjay Chakravarty, Campbell, CA (US); Shubham Shrivastava, Sunnyvale, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 477 days.

(21) Appl. No.: 17/485,746

(22) Filed: Sep. 27, 2021

(65) Prior Publication Data
US 2023/0097584 A1    Mar. 30, 2023

(51) Int. Cl.
| | |
|---|---|
| *G06T 3/40* | (2024.01) |
| *G05D 1/00* | (2006.01) |
| *G06N 3/08* | (2023.01) |
| *G06T 3/18* | (2024.01) |
| *G06T 3/4038* | (2024.01) |
| *G06T 7/73* | (2017.01) |

(52) U.S. Cl.
CPC ......... *G06T 3/4038* (2013.01); *G05D 1/0251* (2013.01); *G06N 3/08* (2013.01); *G06T 3/18* (2024.01); *G06T 7/73* (2017.01)

(58) Field of Classification Search
CPC ........... G06T 3/4038; G06T 3/18; G06T 7/73; G05D 1/0251; G05D 1/0282; G06N 3/08; G06N 3/0895; G06N 3/048; G06N 3/0464; G06N 7/01
USPC ...................................................... 382/276
See application file for complete search history.

(56) References Cited

U.S. PATENT DOCUMENTS

| | | | |
|---|---|---|---|
| 5,729,471 A | * | 3/1998 | Jain ...................... H04N 5/2627 348/E13.058 |
| 9,558,557 B2 | | 1/2017 | Jiang et al. |
| (Continued) | | | |

FOREIGN PATENT DOCUMENTS

| | | |
|---|---|---|
| CN | 111340710 A | 6/2020 |
| CN | 111862673 A | 10/2020 |
| (Continued) | | |

OTHER PUBLICATIONS

"ArUco: a minimal library for Augmented Reality applications based on Open CV", (Aplicaciones de la Visi\363n Artificial), AVA, Jul. 17, 2020.

*Primary Examiner* — Jerome Grant, II
(74) *Attorney, Agent, or Firm* — Frank A. MacKenzie; Bejin Bieneman PLC

(57) ABSTRACT

A plurality of virtual three-dimensional points distributed on a 3D reference plane for a camera array including a plurality of cameras are randomly selected. The plurality of cameras includes a host camera and one or more additional cameras. Respective two-dimensional projections of the plurality of virtual 3D points for the plurality of cameras are determined based on respective poses of the cameras. For the respective one or more additional cameras, respective homography matrices are determined based on the 2D projections for the respective camera and the 2D projections for the host camera. The respective homography matrices map the 2D projections for the respective camera to the 2D projections for the host camera. A stitched image is generated based on respective images captured by the plurality of cameras and the respective homography matrices.

20 Claims, 13 Drawing Sheets

(56) References Cited

U.S. PATENT DOCUMENTS

| | | | |
|---|---|---|---|
| 2013/0208009 A1 | 8/2013 | Moden | |
| 2018/0349725 A1* | 12/2018 | Konolige | ................ B25J 9/161 |
| 2020/0302628 A1 | 9/2020 | DeTone et al. | |
| 2021/0333759 A1* | 10/2021 | Vasavada | ............... H04N 23/57 |
| 2022/0070426 A1* | 3/2022 | Sinharoy | ................ G06T 7/593 |

FOREIGN PATENT DOCUMENTS

| | | | | |
|---|---|---|---|---|
| CN | 112288827 | * | 1/2021 | ................ G06T 7/85 |
| CN | 112040265 | * | 8/2022 | ........... H04N 21/021 |
| KR | 100943719 | * | 2/2010 | ............ H04N 13/00 |
| WO | WO2021119363 | * | 6/2021 | ............ H04N 23/56 |

\* cited by examiner

OBJECT POSE ESTIMATION

BACKGROUND

Deep neural networks can be trained to perform a variety of computing tasks. For example, neural networks can be trained to extract data from images. Data extracted from images by deep neural networks can be used by computing devices to operate systems including vehicles, robots, security, product manufacturing and product tracking. Images can be acquired by sensors included in a system and processed using deep neural networks to determine data regarding objects in an environment around a system. Operation of a system can be supported by acquiring accurate and timely data regarding objects in a system's environment.

DETAILED DESCRIPTION

Figure 1:
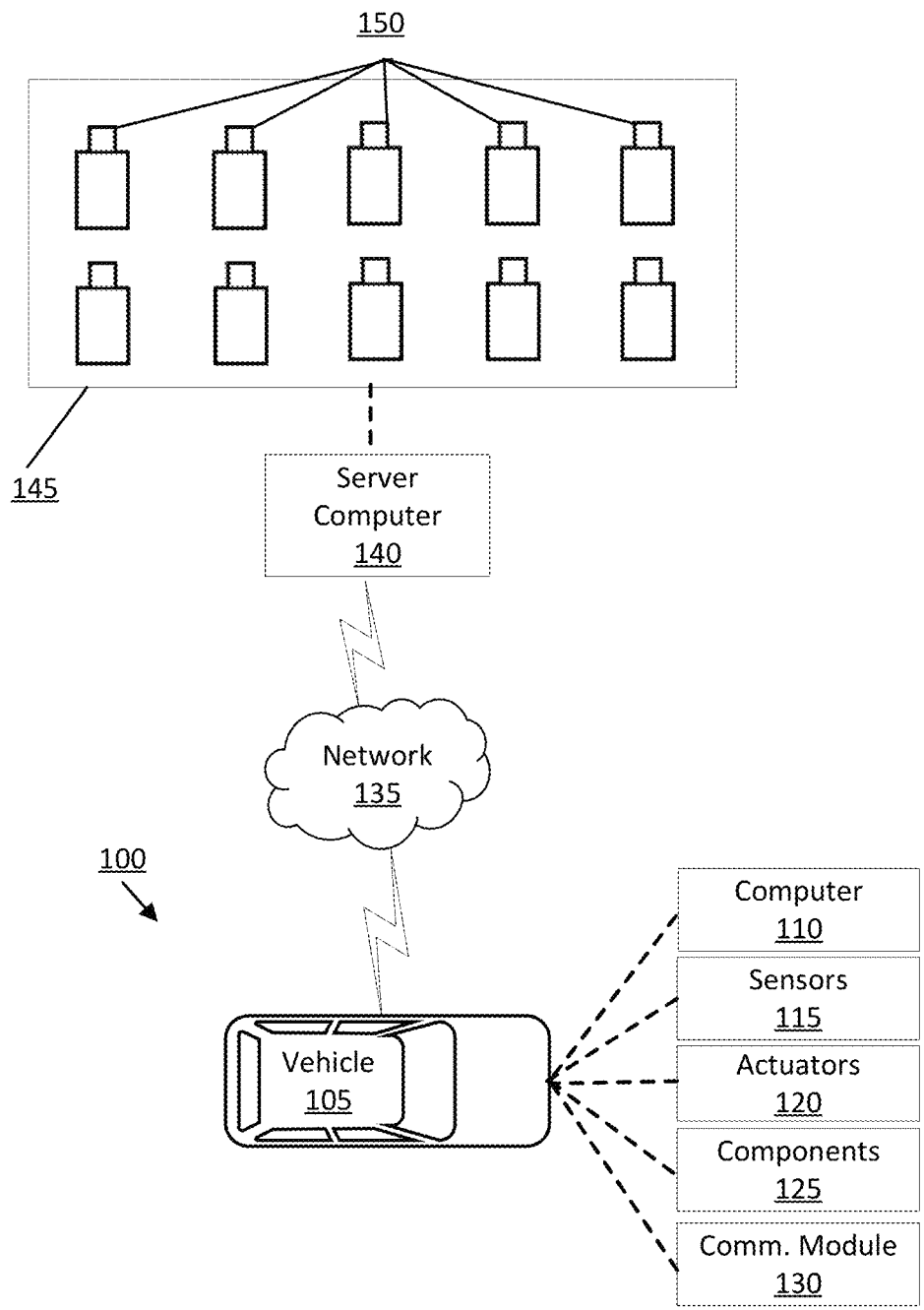
FIG. 1 is a block diagram of an example traffic infrastructure system.

A deep neural network (DNN) can be trained to determine objects in image data acquired by sensors using a training dataset for systems including vehicle guidance, robot operation, security, manufacturing, and product tracking. Vehicle guidance can include operation of vehicles in autonomous or semi-autonomous modes. Robot guidance can include guiding a robot end effector, for example a gripper, to pick up a part and orient the part for assembly. Security systems include features where a computer acquires video data from a camera observing a secure area to provide access to authorized users and detect unauthorized entry. Security systems can also provide an authorized user access to a computing device or cell phone, for example. In a manufacturing system, a DNN in a computer can detect undesired operation of machinery in a manufacturing operation by determining a location of a person's hands at a particular time in relation to a machine operating cycle, for example. In a product tracking system, a deep neural network can detect a person removing an object from a shelf and putting it into a shopping cart and automatically charge the person for the object, for example. Other product tracking systems include package sorting for shipping, for example.

Vehicle guidance will be described herein as a non-limiting example of using a DNN to detect objects, for example, vehicles. For example, a computing device in a traffic infrastructure system can be programmed to acquire data regarding its environment and to detect objects in the data using a DNN. The data can include image data acquired from a still or video camera and range data acquired from a range sensor including a lidar sensor. A DNN can be trained to label and locate objects in the image data or range data. A computing device included in the traffic infrastructure system can use the identity and location of the detected objects to determine a vehicle path upon which to operate a vehicle in an autonomous or semi-autonomous mode. A vehicle can operate based on a vehicle path by determining commands to direct the vehicle's powertrain, braking, and steering components to operate the vehicle to travel along the path.

However, image data from one camera of a plurality of cameras in the traffic infrastructure system may lack sufficient data about a detected vehicle to correctly determine an orientation of the detected vehicle. For example, the image data from the one camera may include a portion of the detected vehicle. In this situation, a plurality of orientations for the vehicle may correspond the detected portion of the vehicle in the image data from the one camera. Techniques discussed herein improve determination of a detected vehicle's orientation by acquiring respective image data of the vehicle from the plurality cameras and generating a stitched image from the plurality of images based on respective homography matrices between a host camera and additional cameras in the plurality of cameras.

A system includes a computer including a processor and a memory, the memory storing instructions executable by the processor to randomly select a plurality of virtual three-dimensional (3D) points distributed on a 3D reference plane for a camera array including a plurality of cameras. The plurality of cameras including a host camera and one or more additional cameras. The instructions further include instructions to determine respective two-dimensional (2D) projections of the plurality of virtual 3D points for the plurality of cameras based on respective poses of the cameras. The instructions further include instructions to determine, for the respective one or more additional cameras, respective homography matrices based on the 2D projections for the respective camera and the 2D projections for the host camera. The respective homography matrices map the 2D projections for the respective camera to the 2D projections for the host camera. The instructions further include instructions to generate a stitched image based on respective images captured by the plurality of cameras and the respective homography matrices.

The instructions can further include instructions to input the stitched image into a neural network that outputs a pose of an object included in the stitched image.

The pose of the object can be determined in coordinates of a real-world coordinate system based on orthogonal x, y, and z axes and a yaw rotation about the z axis.

The object can be a vehicle. The instructions can further include instructions to generate a path for the vehicle based on the determined pose. The instructions can further include instructions to operate the vehicle along the generated path.

The instructions can further include instructions to determine a first 2D silhouette of the object based on inputting the pose of the object and a 3D model of the object to a silhouette rendering program. The instructions can further include instructions to determine a second 2D silhouette of the object based on the stitched image. The instructions can further include instructions to train the neural network based on a difference between the first 2D silhouette and the second 2D silhouette.

The instructions can further include instructions to determine respective poses of the plurality of cameras based on calibration images captured by the respective cameras and including a fiducial marker.

The poses of the respective cameras can be determined in coordinates of a real-world coordinate system based on orthogonal x, y, and z axes and roll, pitch, and yaw rotations about the x, y, and z axes, respectively.

The instructions can further include instructions to determine update poses for respective cameras based on a reprojection error in the stitched image.

The 3D reference plane can be defined by one of a ground surface or a surface of an object.

The images can be time-synchronized.

The plurality of cameras can be red-green-blue-depth (RGB-D) cameras.

A method includes randomly selecting a plurality of virtual three-dimensional (3D) points distributed on a 3D reference plane for a camera array including a plurality of cameras. The plurality of cameras including a host camera and one or more additional cameras. The method further includes determining respective two-dimensional (2D) projections of the plurality of virtual 3D points for the plurality of cameras based on respective poses of the cameras. The method further includes determining, for the respective one or more additional cameras, respective homography matrices based on the 2D projections for the respective camera and the 2D projections for the host camera. The respective homography matrices map the 2D projections for the respective camera to the 2D projections for the host camera. The method further includes generating a stitched image based on respective images captured by the plurality of cameras and the respective homography matrices.

The method can further include inputting the stitched image into a neural network that outputs a pose of an object included in the stitched image.

The pose of the object can be determined in coordinates of a real-world coordinate system based on orthogonal x, y, and z axes and a yaw rotation about the z axis The object can be a vehicle. The method can further include generating a path for the vehicle based on the determined pose. The method can further include operating the vehicle along the generated path.

The method can further include determining a first 2D silhouette of the object based on inputting the pose of the object and a 3D model of the object to a silhouette rendering program. The method can further include determining a second 2D silhouette of the object based on the stitched image. The method can further include training the neural network based on a difference between the first 2D silhouette and the second 2D silhouette.

The method can further include determining respective poses of the plurality of cameras based on calibration images captured by the respective cameras and including a fiducial marker.

The poses of the respective cameras can be determined in coordinates of a real-world coordinate system based on orthogonal x, y, and z axes and roll, pitch, and yaw rotations about the x, y, and z axes, respectively.

The method can further include determining updated poses for respective cameras based on a reprojection error in the stitched image.

Further disclosed herein is a computing device programmed to execute any of the above method steps. Yet further disclosed herein is a computer program product, including a computer readable medium storing instructions executable by a computer processor, to execute an of the above method steps.

With reference to FIGS. 1-11, an example traffic infrastructure system 100 includes a vehicle 105, a remote server computer 140, and a remote camera array 145 including a plurality of cameras 150 positioned to obtain respective images of an operating area 200. A vehicle computer 110 in the vehicle 105 is programmed to operate the vehicle 105 using a four degree-of-freedom (4DoF) pose for the vehicle 105 received from the remote server computer 140, as discussed below.

To determine the 4DoF pose for the vehicle 105, the remote server computer 140 is programmed to randomly select a plurality of virtual three-dimensional (3D) points 502 distributed on a 3D reference plane 500 for the remote camera array 145. The plurality of cameras 150 include a host camera 152 and one or more additional cameras 154. The remote server computer 140 is further programmed to determine respective two-dimensional (2D) projections 612 of the plurality of virtual 3D points 502 for the plurality of cameras 150 based on respective poses of the cameras 150. The remote server computer 140 is further programmed to determine, for the respective one or more additional cameras 154, respective homography matrices based on the 2D projections 612 for the respective additional camera 154 and the 2D projections 612 for the host camera 152. The respective homography matrices map the 2D projections 612 for the respective additional camera 154 to the 2D projections 612 for the host camera 152. The remote server computer 140 is further programmed to generate a stitched image 700 based on respective images captured by the plurality of cameras 150 and the respective homography matrices.

Techniques described herein can generate the stitched image 700 from a perspective of the host camera 152. Any one of the cameras 150 may be selected as the host camera 152. For example, upon generating a stitched image 700 from the perspective of one camera 150, the remote server computer 140 can select another camera 150 as the host camera 152 and generate a subsequent stitched image 700 from the perspective of the other camera 150. That is, the remote server computer 140 can generate a plurality of stitched images 700 from respective perspectives of the plurality of cameras 150.

Turning now to FIG. 1, the vehicle 105 includes the vehicle computer 110, sensors 115, actuators 120 to actuate various vehicle components 125, and a vehicle communications module 130. The communications module 130 allows the vehicle computer 110 to communicate with a remote server computer 140, and/or other vehicles, e.g., via a messaging or broadcast protocol such as Dedicated Short Range Communications (DSRC), cellular, and/or other protocol that can support vehicle-to-vehicle, vehicle-to infrastructure, vehicle-to-cloud communications, or the like, and/or via a packet network 135.

The vehicle computer 110 includes a processor and a memory such as are known. The memory includes one or more forms of computer-readable media, and stores instructions executable by the vehicle computer 110 for performing various operations, including as disclosed herein. The vehicle computer 110 can further include two or more computing devices operating in concert to carry out vehicle operations including as described herein. Further, the vehicle computer 110 can be a generic computer with a processor and memory as described above, and/or may include an electronic control unit (ECU) or electronic controller or the like for a specific function or set of functions, and/or may include a dedicated electronic circuit including an ASIC that is manufactured for a particular operation, e.g., an ASIC for processing sensor data and/or communicating the sensor 115 data. In another example, the vehicle computer 110 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in the vehicle computer 110.

The vehicle computer 110 may operate and/or monitor the vehicle 105 in an autonomous mode, a semi-autonomous mode, or a non-autonomous (or manual) mode, i.e., can control and/or monitor operation of the vehicle 105, including controlling and/or monitoring components 125. For purposes of this disclosure, an autonomous mode is defined as one in which each of vehicle 105 propulsion, braking, and steering are controlled by the vehicle computer 110; in a semi-autonomous mode the vehicle computer 110 controls one or two of vehicle 105 propulsion, braking, and steering; in a non-autonomous mode a human operator controls each of vehicle 105 propulsion, braking, and steering.

The vehicle computer 110 may include programming to operate one or more of vehicle 105 brakes, propulsion (e.g., control of acceleration in the vehicle 105 by controlling one or more of an internal combustion engine, electric motor, hybrid engine, etc.), steering, transmission, climate control, interior and/or exterior lights, horn, doors, etc., as well as to determine whether and when the vehicle computer 110, as opposed to a human operator, is to control such operations.

The vehicle computer 110 may include or be communicatively coupled to, e.g., via a vehicle communications network such as a communications bus as described further below, more than one processor, e.g., included in electronic controller units (ECUs) or the like included in the vehicle 105 for monitoring and/or controlling various vehicle components 125, e.g., a transmission controller, a brake controller, a steering controller, etc. The vehicle computer 110 is generally arranged for communications on a vehicle communication network that can include a bus in the vehicle 105 such as a controller area network (CAN) or the like, and/or other wired and/or wireless mechanisms.

Via the vehicle 105 network, the vehicle computer 110 may transmit messages to various devices in the vehicle 105 and/or receive messages (e.g., CAN messages) from the various devices, e.g., sensors 115, actuators 120, ECUs, etc. Alternatively, or additionally, in cases where the vehicle computer 110 actually comprises a plurality of devices, the vehicle communication network may be used for communications between devices represented as the vehicle computer 110 in this disclosure. Further, as mentioned below, various controllers and/or sensors 115 may provide data to the vehicle computer 110 via the vehicle communication network.

The vehicle computer 110 is programmed to receive data from one or more sensors 115 substantially continuously, periodically, and/or when instructed by a remote server computer 140, etc. The sensors 115 may include a variety of devices such as are known, e.g., Light Detection And Ranging (LIDAR) sensor (s), radar sensors, camera sensors, etc., to provide data to the vehicle computer 110.

The vehicle 105 actuators 120 are implemented via circuits, chips, or other electronic and or mechanical components that can actuate various vehicle 105 subsystems in accordance with appropriate control signals as is known. The actuators 120 may be used to control components 125, including braking, acceleration, and steering of a vehicle 125.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a suspension component (e.g., that may include one or more of a damper, e.g., a shock or a strut, a bushing, a spring, a control arm, a ball joint, a linkage, etc.), a brake component, a park assist component, an adaptive cruise control component, an adaptive steering component, one or more passive restraint systems (e.g., airbags), a movable seat, etc.

In addition, the vehicle computer 110 may be configured for communicating via a vehicle-to-vehicle communications module 130 or interface with devices outside of the vehicle, e.g., through a vehicle-to-vehicle (V2V) or vehicle-to-infrastructure (V2X) wireless communications (cellular and/or short-range radio communications, etc.) to another vehicle, and/or to a remote server computer 140 (typically via direct radio frequency communications). The communications module 130 could include one or more mechanisms, such as a transceiver, by which the computers of vehicles may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module include cellular, Bluetooth, IEEE 802.11, dedicated short range communications (DSRC), cellular V2X (CV2X), and/or wide area networks (WAN), including the Internet, providing data communication services. For convenience, the label "V2X" is used herein for communications that may be vehicle-to-vehicle (V2V) and/or vehicle-to-infrastructure (V2I), and that may be provided by the communications module 130 according to any suitable short-range communications mechanism, e.g., DSRC, cellular, or the like.

The network 135 represents one or more mechanisms by which a vehicle computer 110 may communicate with remote computing devices, e.g., the remote server computer 140, another vehicle computer, etc. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks 135 include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The remote server computer 140 can be a conventional computing device, i.e., including one or more processors and one or more memories, programmed to provide operations such as disclosed herein. Further, the remote server computer 140 can be accessed via the network 135, e.g., the Internet, a cellular network, and/or or some other wide area network.

The plurality of cameras 150 in the remote camera array 145 are positioned to view the operating area 200 from above. The plurality of cameras 150 may, for example, be spaced from each other so as to minimize overlap of their respective fields of view. Alternatively, the plurality of cameras 150 may be spaced from each other so as to achieve a desired amount of overlap, e.g., specified by an owner of a structure defining the operating area 200.

The cameras 150 may, for example, be any suitable type of camera which is capable of acquiring registered visual and range data. Registered visual and range data, referred to herein as RGB-D (red, green, blue, distance) image data, is image data in which corresponding pixels in the RGB, or visual image, and the D, or range image, acquire data from the same point in the external environment. One non-limiting example of a camera 150 is a red-green-blue-depth (RGB-D) camera. In such an example, the camera 150 may include a photosensitive array (not shown), an infrared (IR) emitter (not shown), and an IR depth sensor (not shown). In operation, the camera 150 determines one or more images (e.g., image frames), and each image frame comprises color information and depth information corresponding to objects within the image frame. For example, the photosensitive array may receive color image data while concurrently the IR emitters and IR depth sensors are used to determine depth image data; and ultimately a processor (not shown) of the camera 150 correlates both color image data and depth image data into an image which is provided to remote server computer 140 (as described below). Two non-limiting commercial examples of RGB-D cameras are the Astra S 3D Camera by Orbbec and the Realsense D435 by Intel; other examples exist. In some implementations of the traffic infrastructure system 100, an RGB-D camera is desirable as RGB-D cameras typically have a front focal distance (FFD) between 2 and 5 meters (e.g., as opposed to lidar systems which typically have an FFD in the hundreds of meters). The shorter FFD for the RGB-D camera as compared to lidar systems allows the RGB-D camera to capture a wider field of view than lidar systems. Additionally, the shorter FFD allows the RGB-D camera to capture a deeper depth of field, i.e., a larger distance between a nearest and a farthest object from the RGB-D camera that is in focus in an image, than lidar systems.

As another example, a camera 150 may obtain image data of the operating area 200. Image data herein means digital image data, e.g., comprising pixels with intensity and color values. Additionally, a lidar system may obtain depth data, i.e., a range between the camera 150 and a surface of an object within the field of view of the camera 150. In this situation, the remote server computer 140 could employ various techniques for fusing data from the lidar sensor and the camera 150. Sensor 115 fusion is combining data from disparate sources together so that the resulting data has less uncertainty than if the data from each source were used individually, e.g., in creating a unified model of the surrounding environment of the vehicle 105. The sensor 115 fusion can be performed with one or more algorithms, e.g., Kalman filter, Bayesian networks, Dempster-Shafer, convolutional neural networks, etc.

Figure 2:
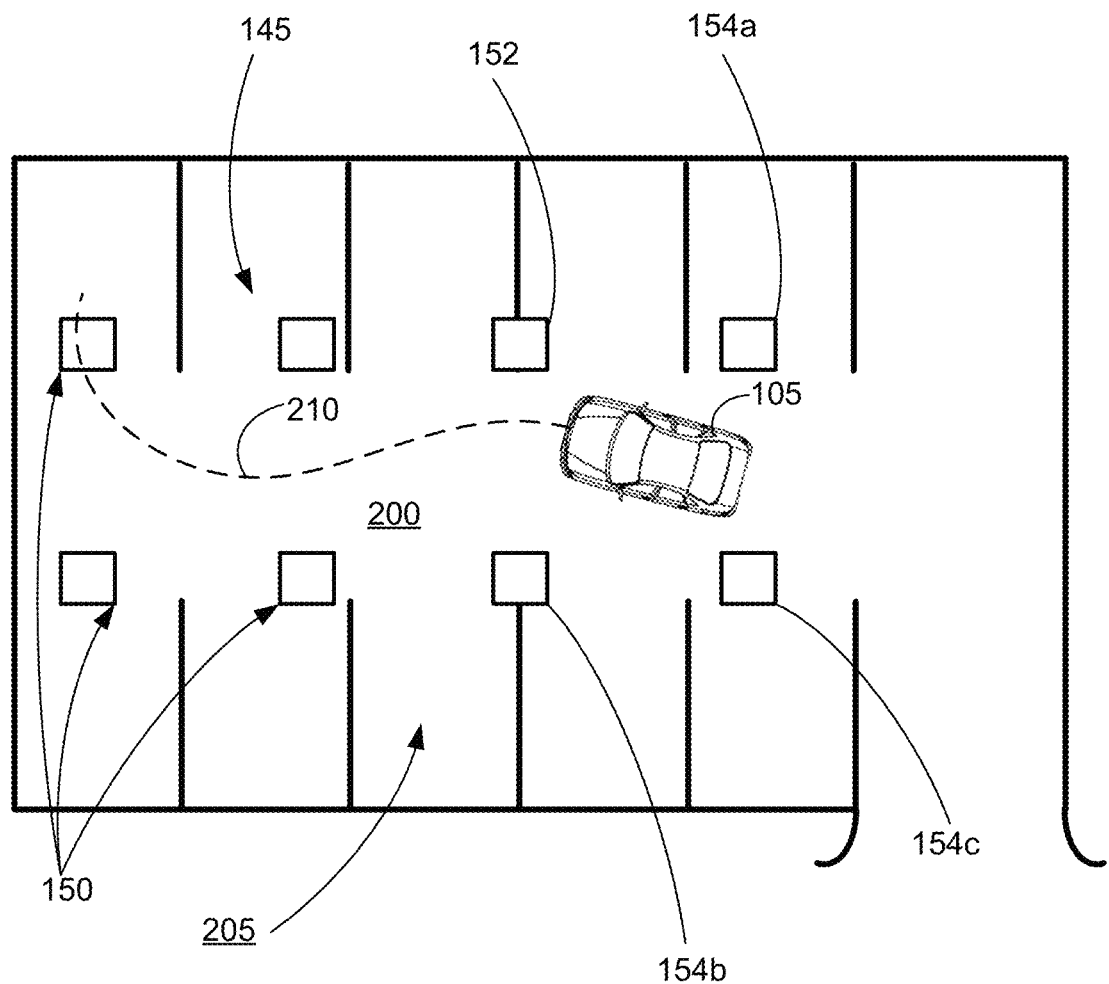
FIG. 2 is a diagram of an example operating area.

FIG. 2 is a diagram illustrating a vehicle 105 operating in an example operating area 200 that includes marked sub-areas 205 (e.g., parking spaces) for vehicles 105. An operating area 200 is a specified area of ground surface for operating and/or stowing a vehicle 105. The operating area 200 may be included in a structure, e.g., a parking deck (i.e., a structure that includes one or more floors upon which a vehicle can be operated and/or stowed), manufacturing facilities, service facilities, a tunnel, etc. The structure includes a ceiling above the operating area 200. The ceiling may or may not be parallel to the operating area 200. The plurality of cameras 150, including a host camera 152 and additional cameras 154a, 154b, 154c, are mounted to the ceiling. A sub-area 205 may, for example, be a parking space indicated by conventional markings, e.g., painted lines on a ground surface, and conventional image recognition techniques can be employed by the vehicle computer 110 to identify the sub-area 205.

In general, at least some regions of operating area 200 may be devoid of a useful satellite-based positioning signal (i.e., absent a satellite-based positioning signal or alternatively, the satellite positioning signal is present but weak). Weak may be defined as being attenuated and being less than a threshold; e.g., the threshold may be below a predetermined value that is usable by vehicle-navigation equipment. According to an example, the satellite-based positioning signal may be a wireless signal from a satellite using global positioning system (GPS), global satellite navigation system (GLONASS), or the like.

Respective six degree-of-freedom (6DoF) poses for the cameras 150 with respect to a global coordinate system can be determined and therefore determining the location of a vehicle 105 in a stitched image 700 generated from images acquired by the cameras 150 can determine the location of the vehicle 105 with respect to the global coordinate system. The remote server computer 140 can communicate with the cameras 150 to determine a vehicle path 210 upon which the vehicle 105 can operate to travel through the operating area 200, e.g., to a sub-area 205. The vehicle path 210 can be communicated to the vehicle 105 to permit the vehicle 105 to operate autonomously or semi-autonomously through the operating area 200.

The remote server computer 140 can include a DNN, i.e., a software program that permits the remote server computer 140 to determine a 4DoF pose for the vehicle 105 relative to the operating area 200. The remote server computer 140 can then determine the vehicle path 210 based on the 4DoF pose for the vehicle 105. The vehicle path 210 can include a plurality of locations, which can be called "breadcrumbs" which, when joined, for example, by a polynomial function, can be used to operate a vehicle 105 to a location, e.g., a sub-area 205, in the operating area 200. While the vehicle 105 is operating in operating area 200, the cameras 150 can be acquiring data regarding the location of vehicle 105 to determine whether the vehicle 105 is correctly following the vehicle path 210 determined by the remote server computer 140. In examples where the vehicle 105 is deviating from the vehicle path 210, remote server computer 140 can transmit updated commands to the vehicle computer 110 to correct the operation of vehicle 105, e.g., by actuating one or more vehicle components 125.

Figure 3:
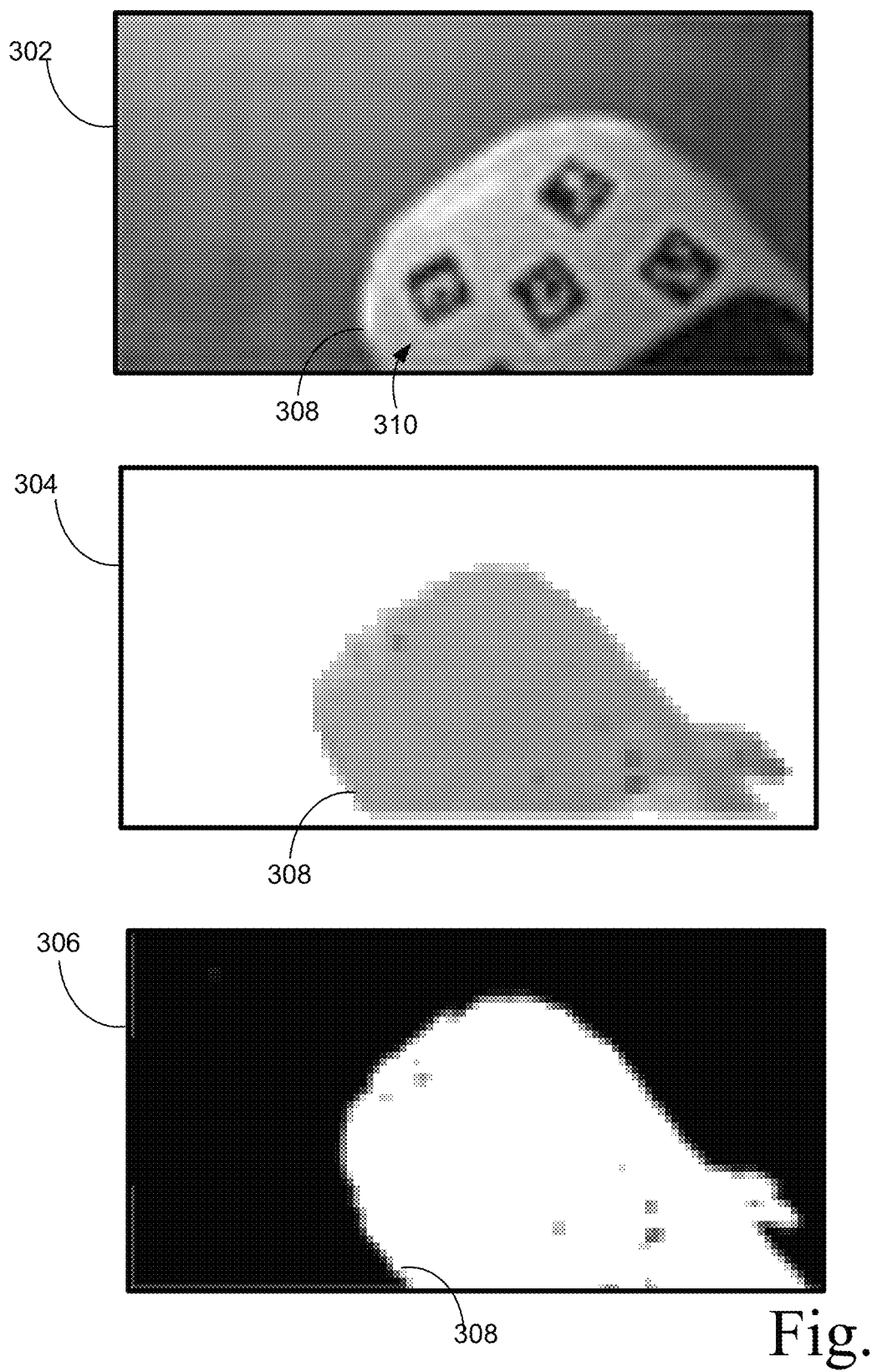
FIG. 3 is a diagram of three example images of a calibration vehicle.

FIG. 3 is a diagram that includes an example RGB image 302, an example depth image 304, and an example binary image 306 from an RGB-D camera 150. The RGB image 302, the depth image 304, and the binary image 306 each includes a same portion of a calibration vehicle 308. The RGB image 302 is acquired by the visual portion of an RGB-D camera 150.

The depth image 304 is acquired by a range sensor such as a lidar sensor or by the depth or range portion of an RGB-D camera 150. In examples discussed herein, the depth image 304 is registered with the RGB image 302. This means that for a given pixel x, y location in images 302, 304, the RGB image 302 will include the color of a location and the depth image 304 will include the distance or range to the same location. In examples where the RGB image 302 and depth image 304 are not registered, the offset in locations of each pixel between the RGB image 302 and the depth image 304 can be determined, and the offset can be used to register the RGB image 302 and the depth image 304.

The binary image 306 is the result of thresholding depth image 304. Thresholding is an image processing operation where a threshold value is selected and all pixels having value greater than or equal to the threshold value are set to "1" and all pixels having a value less that the threshold value are set to "0". Thresholding a depth image 304 to determine a binary image 306 permits determining differences in vehicle location between a binary image 306 formed by thresholding a depth image 304 and a vehicle location in a binary image determined by rendering a depth image based on a three-dimensional (3D) model of a vehicle. Techniques discussed herein can train a first deep neural network (DNN) 800 (as described below in relation to FIG. 8) by inputting a stitched depth image to the first DNN 800 to determine a 4DoF pose for a vehicle 105 included in the stitched depth image. The 4DoF pose can be converted into a format for input to an image rendering software program by determining translation and rotation matrices that can be used to translate and rotate a 3D model from an input pose to a pose corresponding to the 4DoF pose. Translation moves the 3D model in the x, y plane and rotation rotates the 3D model around the z axis at a selected center point 3D model. Converting the 4DoF pose in this fashion preserves the differentiability of the 4DoF pose. This is important when the 4DoF pose is used to determine a loss function for training the first DNN 800 as discussed in relation to FIG. 11, below.

The calibration vehicle 308 includes a fiducial marker 310. A fiducial marker 310 can include a number of ArUco fiducial marks. ArUco fiducial marks are two-dimensional (2D) patterns from a library of fiducial marks described at www.uco.es/grupos/ava/node/26, "Aplicaciones de la Vision Artificial", University of Cordoba, Spain, May 15, 2019. ArUco fiducial marks are designed to be read by machine vision software that can determine a pose with respect to a coordinate system for each ArUco fiducial mark included in a fiducial marker 310 by processing a 2D image of the fiducial marker 310.

The calibration vehicle 308 may include a computer (not shown) that includes a second processor and a second memory such as are known. The second memory includes one or more forms of computer-readable media, and stores instructions executable by the second computer for performing various operations, including as disclosed herein.

Additionally, the calibration vehicle 308 may include sensors (not shown), actuators (not shown) to actuate various components (not shown), and a communications module (not shown). The sensors, actuators to actuate various components, and the communications module typically have features in common with the sensors 115, actuators 120 to actuate various vehicle components 125, and the vehicle communications module 130, and therefore will not be described further to avoid redundancy.

Figure 4:
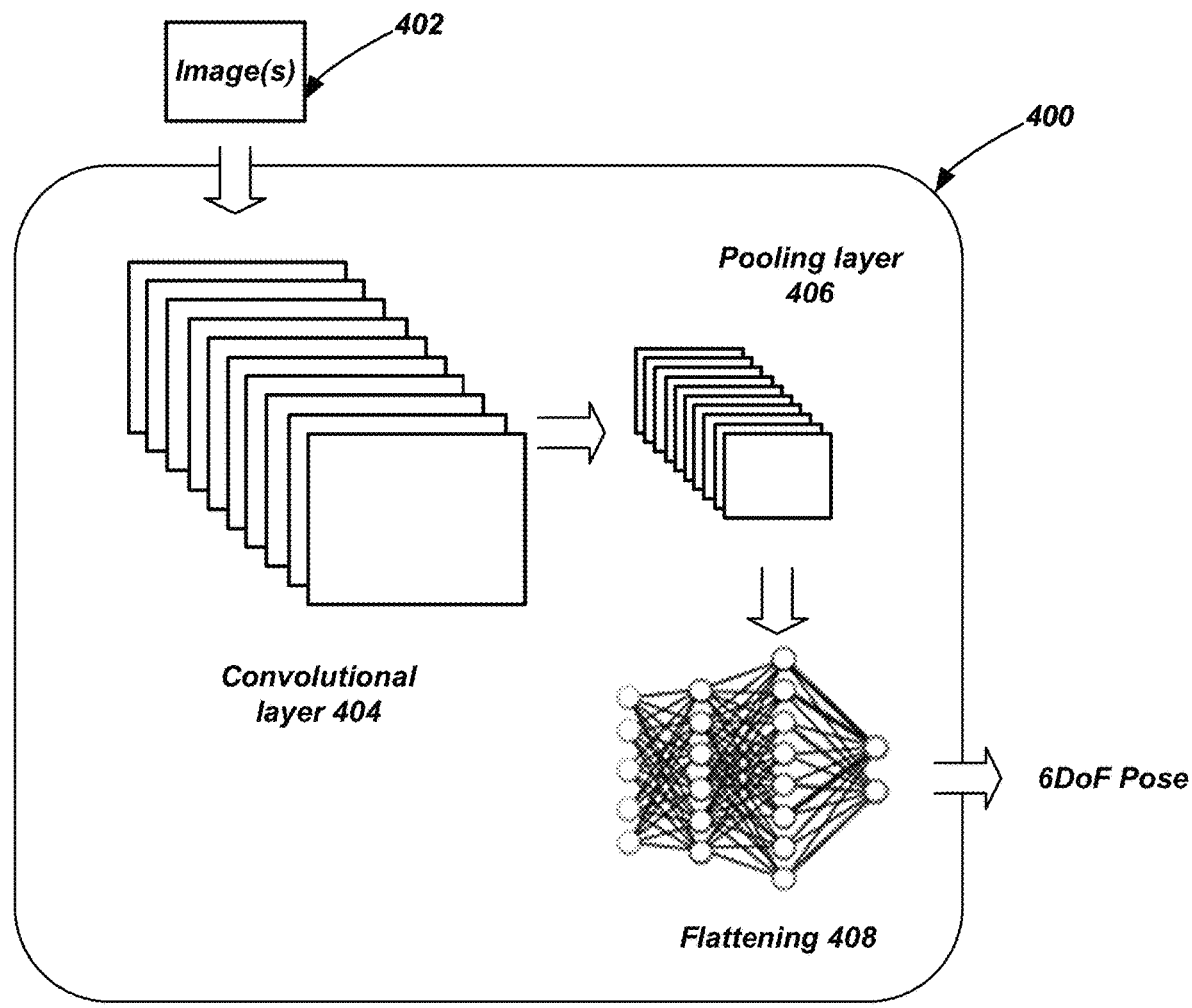
FIG. 4 is a diagram of an example second deep neural network used to determine a six degree-of-freedom pose for a camera.

FIG. 4 is a diagram of an example second deep neural network (DNN) 400 used to determine a six degree-of-freedom (6DoF) pose for a camera 150. The remote server computer 140 can determine respective 6DoF poses for the plurality of cameras 150 in the remote camera array 145 based on respective calibration images 402 acquired by respective cameras 150. A calibration image 402 is an RGB image that includes at least a portion of the calibration vehicle 308, e.g., a fiducial marker 310. Six degree-of-freedom refers to the freedom of movement of an object in three-dimensional space (e.g., translation along three perpendicular axes and rotation about each of the three perpendicular axes). A 6DoF pose of a camera 150 means a location relative to a coordinate system (e.g., a set of coordinates specifying a position in the coordinate system, e.g., X, Y, Z coordinates) and an orientation (e.g., a yaw, a pitch, and a roll) about each axis in the coordinate system. The 6DoF pose of the camera 150 can be determined in real world coordinates based on orthogonal x, y, and z axes and roll, pitch, and yaw rotations about the x, y, and z axes, respectively. The 6DoF pose of the camera 150 locates the camera 150 with respect to a global coordinate system.

As the calibration vehicle 308 traverses the operating area 200, the calibration vehicle 308 can localize itself within the operating area 200. For example, the calibration vehicle 308 can receive location data from a sensor, a navigation system, etc. Location data specifies a point or points on a ground surface and may be in a known form, e.g., geo-coordinates such as latitude and longitude coordinates obtained via a navigation system, as is known, that uses the Global Positioning System (GPS). In this situation, the computer in the calibration vehicle 308 can determine a 6DoF pose for the fiducial marker 310 relative to the global coordinate system. For example, a location of the fiducial marker 310 relative to the calibration vehicle 308 can be physically measured. The 6DoF pose of the fiducial marker 310 can then be determined by combining the geo-coordinates with the physically measured location of the fiducial marker 310. That is, the 6DoF pose for the fiducial marker 310 locates the fiducial marker 310 relative to the global coordinate system. The computer in the calibration vehicle 308 can then provide the 6DoF pose for the fiducial marker 310 to the remote server computer 140. For example, the computer in the calibration vehicle 308 can transmit the 6DoF pose for the fiducial marker 310 to the remote server computer 140, e.g., via the network 135, V-to-I communications, etc.

As the calibration vehicle 308 enters a field of view of one camera 150, the camera 150 can capture a calibration image 402. The camera 150 can then provide the calibration image 402 to the remote server computer 140. Upon receiving the calibration image 402, the remote server computer 140 can input the calibration image 402 into the second DNN 400. The second DNN 400 may be trained to accept the calibration image 402 as input and to generate an output of a 6DoF pose of the camera 150 with respect to the fiducial marker 310 based on an orientation of the fiducial marker 310 in the calibration image 402.

According to one non-limiting example, the second DNN 400 may comprise a convolutional layer 404, a pooling layer 406, and flattening 408. The convolutional layer 404 may receive image frames and convolve the image frames using a kernel or filter—e.g., yielding a plurality of convolved features. Thereafter, the pooling layers 406 may reduce the spatial size of the convolved features. Typically (although not required), there may exist multiple iterations of convolution followed by pooling. Thereafter, flattening 408 may convert the pooling output to a suitable column vector for input to a neural network, wherein classification occurs (e.g., using at least one predetermined neural network function, e.g., such as SoftMax)—the classification in the instant example pertaining to the 6DoF pose of the camera 150 with respect to the fiducial marker 310. Other aspects and convolution techniques may be employed as well.

The remote server computer 140 can then determine the 6DoF pose for the camera 150 relative to the global coordinate system based on the 6Dof pose of the fiducial marker 310 and the 6DoF pose for the camera 150 relative to the fiducial marker 310. The remote server computer 140 can determine the 6DoF pose for the camera 150 relative to the global coordinate system by concatenation of the fiducial marker 310 pose data and the camera 150 pose data. For example, the 6DoF pose for the camera 150 relative to the global coordinate system can be calculated by performing matrix multiplication using the matrix values representing the fiducial marker 310 pose data and the camera 150 pose data. The remote server computer 140 can continue determining the 6DoF pose for respective cameras 150 relative to the global coordinate system in this manner until a 6DoF pose relative to the global coordinate system is determined for all of the cameras 150 in the remote camera array 145. The remote server computer 140 can then store the respective 6DoF poses for the cameras 150, e.g., in a memory of the remote server computer 140.

Figure 5A:
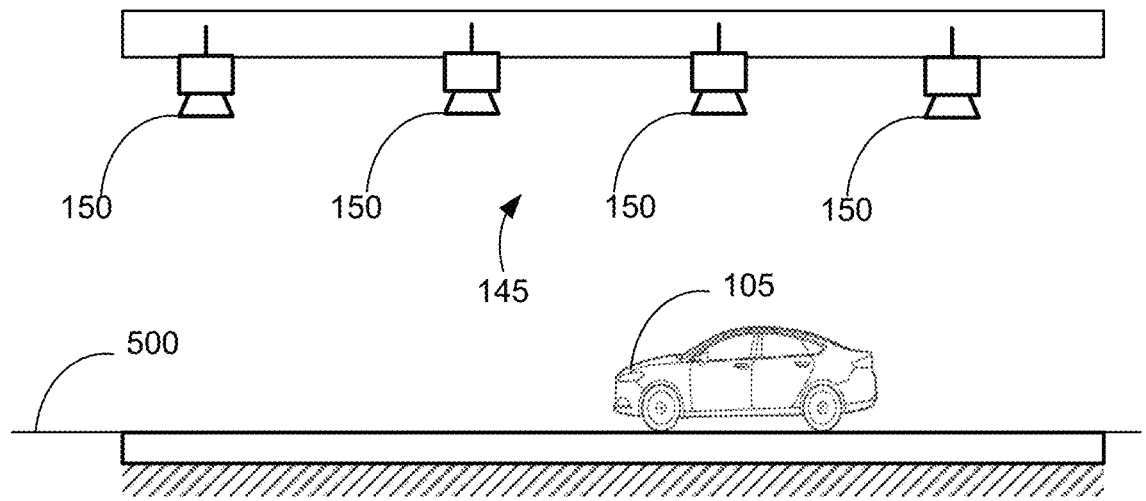
FIGS. 5A and 5B are diagrams of an example 3D reference plane.
Figure 5B:
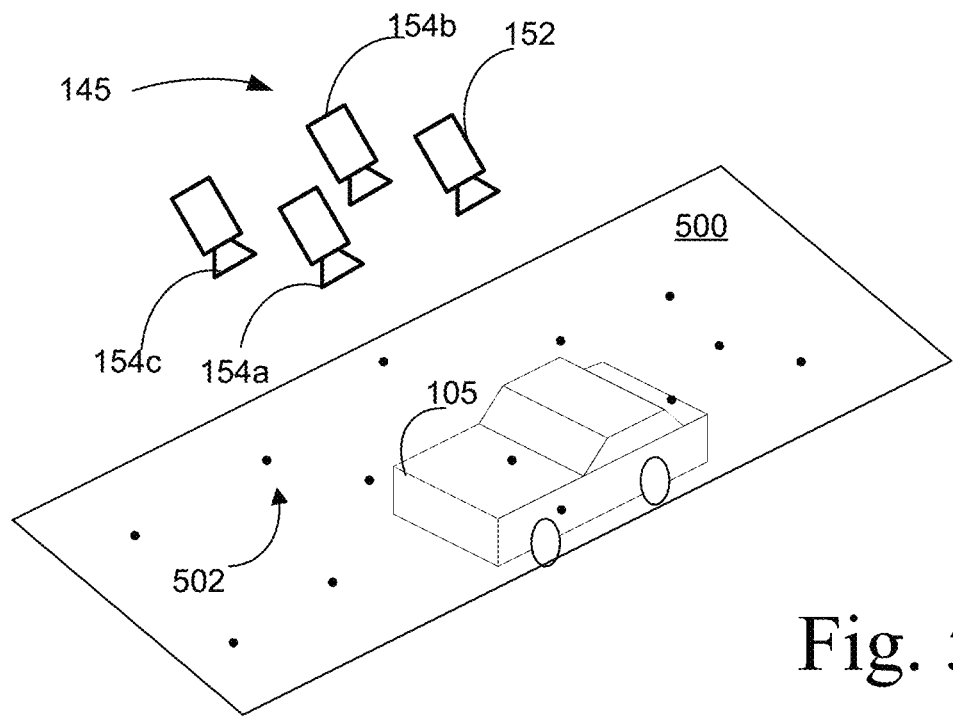

FIGS. 5A and 5B are diagrams of an example 3D reference plane 500. The remote server computer 140 can determine the 3D reference plane 500 based on a depth image 304 acquired by the host camera 152. For example, the remote server computer 140 can determine the 3D reference plane 500 by inserting a plurality of points to the depth image 304 and fitting a plane to the points. The remote server computer 140 inserts the points such that all inserted points exist on a common surface. That is, the remote server computer 140 can insert points to the depth image 304 according to a portion in the depth image 304 indicating a common range from the camera 150. As one example, the common surface can be ground surface of the operating area 200 (see FIG. 5A). As another example, the common surface can be a surface, e.g., a roof, a hood, etc., of a vehicle included in the depth image 304. The 3D reference plane 500 can be fit to the points using a least-squares algorithm, for example. A least-squares algorithm minimizes the differences between the real-world locations of points and the location of the 3D reference plane 500. That is, the 3D reference plane 500 generally corresponds to the common surface.

The 3D reference plane 500 can be described in real-world coordinates. The real-world coordinates can describe the location and orientation of the 3D reference plane 500 in six axes, namely three x, y, and z location axes and three roll, pitch, and yaw rotations about the three location axes, respectively. The 3D reference plane 500 can, for example, extend entirely across the operating area 200.

Upon determining the 3D reference plane 500, the remote server computer 140 randomly selects a plurality of virtual 3D points 502 in the 3D reference plane 500 (see FIG. 5B).

A virtual 3D point 502 is defined by a set of coordinates in the 3D reference plane 500. The remote server computer 140 selects at least four virtual 3D points 502 so that the remote server computer 140 is able to generate respective homography matrices for the additional cameras 154, as discussed below. That is, at least four virtual 3D points 502 are required to fully constrain transformation of an image from a perspective of one camera 150 to a perspective of another camera 150.

Figure 6:
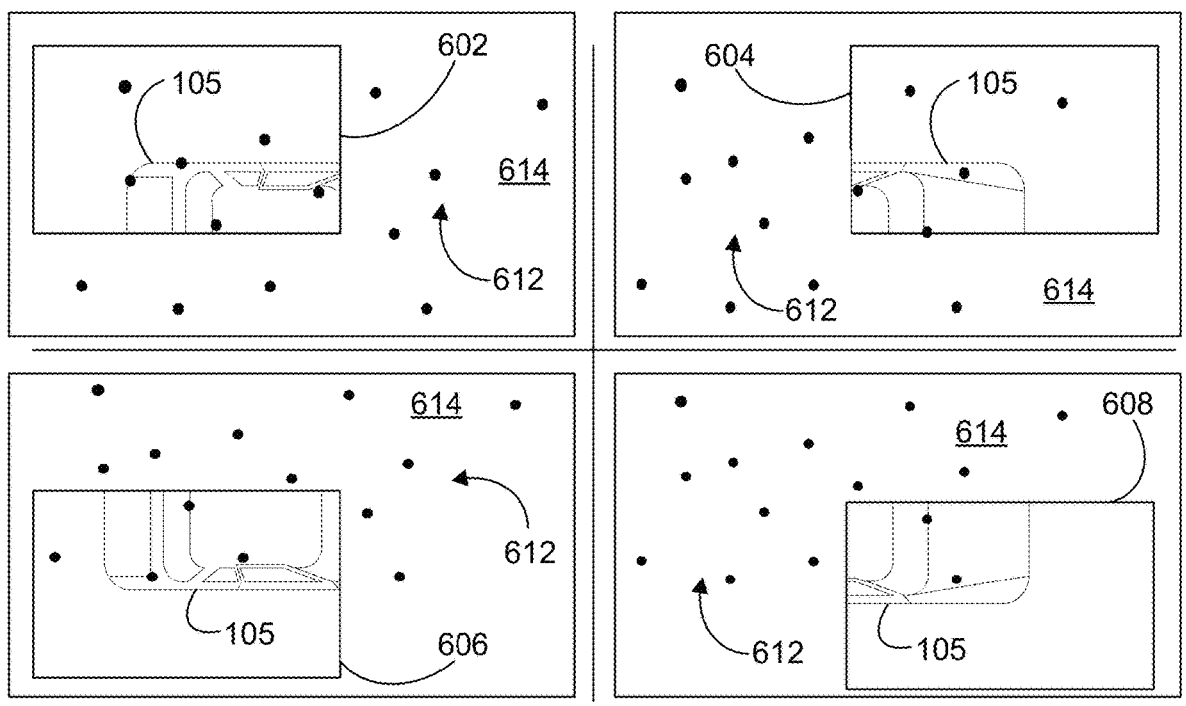
FIG. 6 is a diagram of a plurality of images including a portion of a vehicle and acquired by respective cameras in a camera array.

FIG. 6 is a diagram of example respective images 602, 604, 606, 608 acquired by the host camera 152 and additional cameras 154a, 154b, 154c (see FIG. 2) and 2D projections 612 for the respective cameras 152, 154. Each image 602, 604, 606, 608 includes a portion of a vehicle 105. The portion of the vehicle 105 included in one image 602, 604, 606, 608 may overlap with the portion of the vehicle included in one or more other images 602, 604, 606, 608.

Respective cameras 150 may acquire a plurality of images of the operating area 200. The respective cameras 150 can then provide the respective acquired images to the remote server computer 140. The remote server computer 140 can select the images 602, 604, 606, 608, e.g., from the acquired images received from the respective cameras 150, based on time stamps associated with the respective images 602, 604, 606, 608 corresponding to a same time. That is, the images 602, 604, 606, 608 may be time synchronized.

The remote server computer 140 generates a stitched image 700 based on the plurality of selected images 602, 604, 606, 608 and the 2D projections 612 for the respective cameras 152, 154. Images 604, 606, 608 from three additional cameras 154a, 154b, 154c are shown in FIG. 6, but it is to be understood that respective images from any suitable number of additional cameras 154 can be used to generate the stitched image 700. Generating the stitched image 700 can improve training of a first DNN 800 to determine the 4DoF pose of the vehicle 105 included in the stitched image 700. The plurality of images 602, 604, 606, 608 can be a plurality of RGB images, a plurality of depth images registered with the plurality of RGB images, and/or binary images generated by thresholding the plurality of depth images. That is, techniques described herein can generate a stitched RGB image, a stitched depth image, and/or a stitched binary image.

For the respective cameras 150, the remote server computer 140 can then determine 2D projections 612 corresponding to the virtual 3D points 502 based on the respective 6DoF poses of the cameras 150. For example, the remote server computer 140 can determine 2D projections 612 for a camera 150 corresponding to the virtual 3D points 502 by rendering the virtual 3D points 502. Rendering can produce 2D projections 612 from virtual 3D points 502 by determining a virtual camera point of view from which to project the virtual 3D points 502 to a 2D plane 614.

A virtual camera can be provided by programming of the remote server computer 140 to generate the 2D projections 612 from the virtual 3D points 502. The remote server computer 140 can generate virtual light rays that pass from a virtual image sensor through a virtual lens, obeying the laws of physics just as if the image sensor and lens were physical objects. The remote server computer 140 inserts data into the virtual image sensor corresponding to the appearance of a virtual 3D point 502 that a ray of light emitted by the virtual 3D point 502 and passing through a physical lens would produce on a physical image sensor. By situating a virtual camera at a selected location and orientation with respect to the virtual 3D points 502, 2D projections 612 corresponding to a selected viewpoint with respect to the 3D reference plane 500 can be generated.

The virtual camera point of view includes location and orientation data for an optical axis of the virtual camera and data regarding the magnification of the virtual camera lens. The virtual camera point of view is determined based on the location and orientation of a virtual camera with respect to the 3D reference plane 500. The location of the virtual camera is selected to be the location of the respective camera 150, and the orientation of the virtual camera is selected to be the orientation of the respective camera 150. The location and the orientation of the respective camera 150 are determined from the 6DoF pose of the respective camera 150. Projecting the virtual 3D points 502 onto a 2D plane 614 corresponds to determining the coordinates of the virtual 3D points 502 in the 2D plane 614 relative to a camera 150 at the selected location and orientation. Because the 2D projections 612 were generated from virtual 3D points 502 based on a virtual camera at a selected location and orientation, data regarding the location and orientation of the 2D projections 612 is known.

The 2D plane 614 can be described in real-world coordinates. The real-world coordinates can describe the location and orientation of the 2D plane 614 in three axes, namely x and y location axes and yaw rotation about the z location axis.

Upon determining the 2D projections 612 for the plurality of cameras 150, the remote server computer 140 can compute respective homography matrices for the one or more additional cameras 154 based on the 2D projections 612 for the respective additional camera 154 and the 2D projections 612 for the host camera 152. A homography matrix is used to transform the 2D projections 612 for the respective additional camera 154 from coordinates in an image plane defined by the respective additional camera 154 to coordinates in an image plane defined by the host camera 152. Said differently, the homography matrix provides a mathematical relationship between coordinates of 2D projections 612 in the images. The remote server computer 140 determines the homography matrix based on a translational difference along each of the three orthogonal axes and a rotational difference about each of the three orthogonal axes between 2D projections 612 for the respective additional camera 154 and corresponding 2D projections 612 for the host camera 152.

Figure 7:
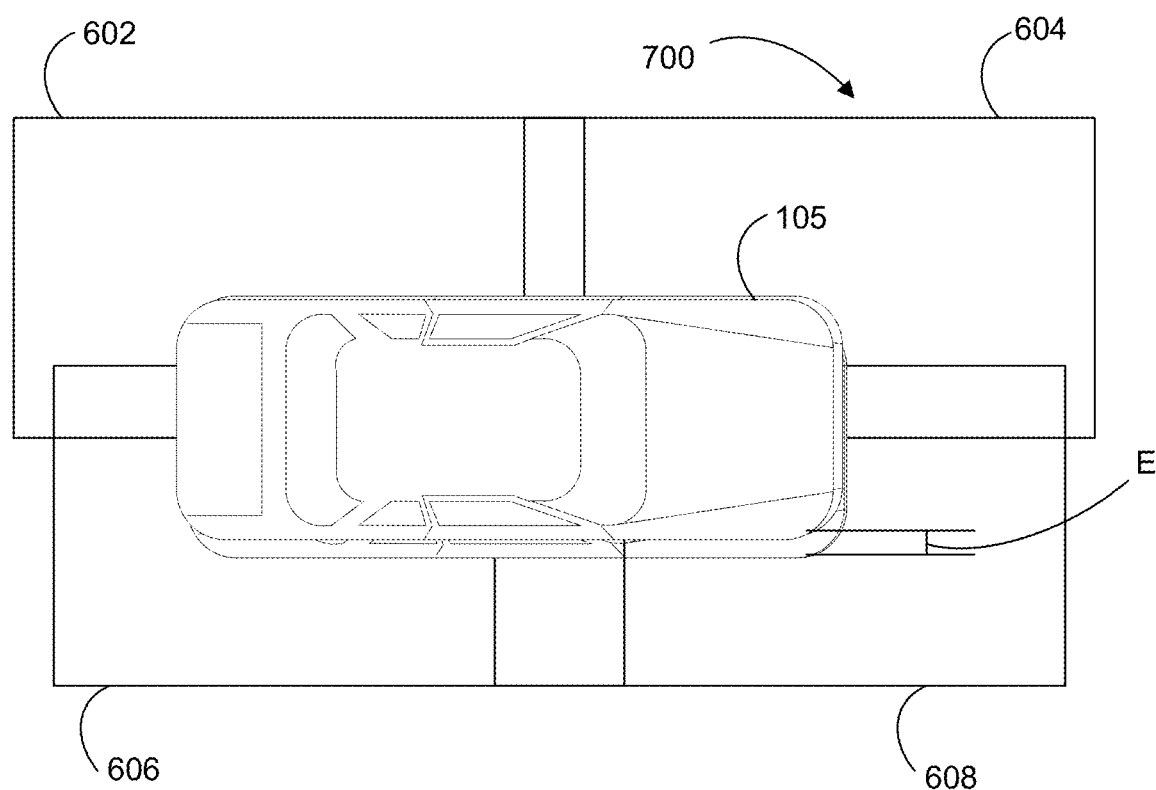
FIG. 7 is a diagram of an example stitched image of the vehicle generated from the plurality of images in FIG. 6.

FIG. 7 is a diagram of a stitched image 700 generated from the plurality of images 602, 604, 606, 608 in FIG. 6. The remote server computer 140 generates the stitched image 700 from the perspective of the host camera 152 based on respective images 604, 606, 608 acquired by the additional cameras 154a, 154b, 154c and the corresponding homography matrices for the respective additional cameras 154a, 154b, 154c. Upon receiving an image 604, 606, 608 from one additional camera 154a, 154b, 154c, the remote server computer 140 warps the image 604, 606, 608, i.e., transforms pixel coordinates for the image 604, 606, 608 to a host pixel coordinate system, e.g., defined by the image plane of the host camera 152, by using the homography matrix for the respective additional camera 154a, 154b, 154c. The remote server computer 140 can then, e.g., employing known computer vision techniques, stitch the image 604, 606, 608 acquired by the additional camera 154a, 154b, 154c to the image 602 acquired by the host camera 152, e.g., by aligning the 2D projections 612 in the respective images 602, 604, 606, 608. The remote server computer 140 can then employ alpha blending to the overlapping portions of the respective images 602, 604, 606, 608. Alpha blending is an image processing technique that adjusts a transparency of overlapped pixels in a stitched image such that an overlapped pixel of one image used to generate the stitched image is, at least partially, transparent, and the corresponding overlapped pixel in another image used to generate the stitched image is visible. As used herein, "transparent" means that the overlapped pixel of the one image does not show through the overlapped pixel of the other image, i.e., the overlapped pixel of the one image is invisible. That is, only the overlapped pixel of the other image is visible. As used herein, "partially transparent", i.e., translucent, means that the overlapped pixel of the one image may show through the overlapped pixel of the other image. In other words, both overlapped pixels may be visible. For example, alpha blending techniques may specify one level, e.g., from 254 levels between fully visible and transparent, of partial transparency for the overlapped pixel of the one image, which corresponds to how visible the overlapped pixel of the one image is relative to the overlapped pixel of the other image. The remote server computer 140 can continue stitching images 604, 606, 608 acquired by additional cameras 154a, 154b, 154c to the image 602 acquired by the host camera 152 in this manner until the entire vehicle 105 is included in the stitched image 700.

The stitched image 700 may include a reprojection error E, i.e., a geometric error corresponding to an image distance (i.e., an offset or misalignment) in the stitched image 700 between corresponding features, e.g., a line, a surface, a marking, etc., included in a plurality of images 602, 604, 606, 608 used to generate the stitched image 700. The remote server computer 140 can update the 6DoF poses for the respective additional cameras 154 based on the reprojection error E. For example, the remote server computer 140 can use a non-linear optimization technique, e.g., Levenberg-Marquardt, to optimize extrinsic calibration parameters, e.g., a rotation matrix and a translation matrix, for the respective additional camera 154 to reduce the reprojection error E in the stitched image 700 between the corresponding features included in the plurality of images 602, 604, 606, 608. The remote server computer 140 can then update the 6DoF poses for the respective additional cameras 154 to correspond to the optimized extrinsic calibration parameters.

Figure 8:
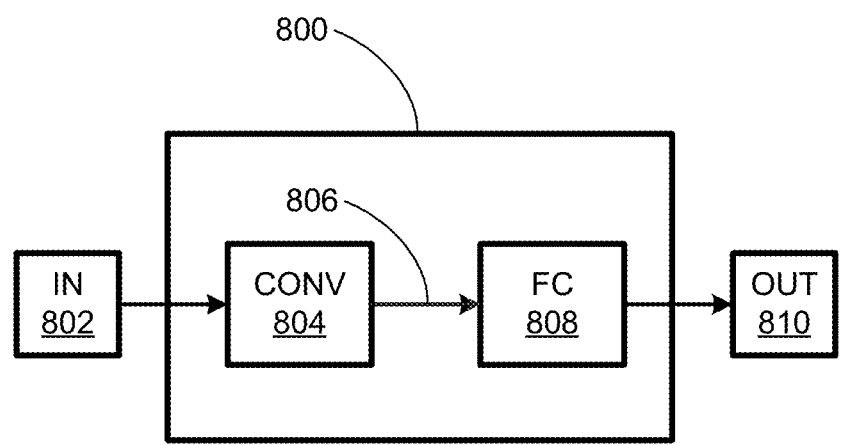
FIG. 8 is a diagram of an example first deep neural network used to determine a four degree-of-freedom pose of an object.

FIG. 8 is a diagram of an example first DNN 800. The first DNN 800 can be a software program executing on the remote server computer 140 included in the traffic infrastructure system 100. In this example, the first DNN 800 is illustrated as a convolutional neural network (CNN). Techniques described herein can also apply to DNNs that are not implemented as CNNs. A first DNN 800 implemented as a CNN typically inputs an input image (IN) 802 as input data. The input image 802 is processed by convolutional layers 804 to form latent variables 806 (i.e., variables passed between neurons in the first DNN 800). Convolutional layers 804 include a plurality of layers that each convolve an input image 802 with convolution kernels that transform the input image 802 and process the transformed input image 802 using algorithms such as max pooling to reduce the resolution of the transformed input image 802 as it is processed by the convolutional layers 804. The latent variables 806 output by the convolutional layers 804 are passed to fully connected layers 808. Fully connected layers 808 include processing nodes. Fully connected layers 808 process latent variables 806 using linear and non-linear functions to determine an output prediction (OUT) 810. In examples discussed herein, the output prediction 810 includes an object label and an object location. The server computer 140 can input a stitched depth image.

First DNN 800 can be trained using a training dataset that includes images and corresponding ground truth. Training datasets for a first DNN 800 can include thousands or millions of images and corresponding annotations or ground truth. Each image of the training dataset can be processed a plurality of times by the first DNN 800. A prediction 810 output from the first DNN 800 in response to an input image 802 is compared to the ground truth corresponding to the input image 802 to determine a loss function. The loss function is a mathematical function that determines how closely the prediction 810 output from the first DNN 800 matches the ground truth corresponding to the input image 802. The value determined by the loss function is input to the convolutional layers 804 and fully connected layers 808 of the first DNN 800 where it is backpropagated to determine weights for the layers that correspond to a minimum loss function. Backpropagation is a technique for training a first DNN 800 where a loss function is input to the convolutional layers 804 and fully connected layers 808 furthest from the input and communicated from back-to-front and determining weights for each layer 804, 808 by selecting weights that minimize the loss function. Training a first DNN 800 to determine a 4DoF pose for a vehicle will be discussed in relation to FIG. 11, below A first DNN 800 can be trained to determine a 4DoF pose for a vehicle. A three-dimensional pose for an object can be specified by determining the location and orientation of the object in 6DoF, as described above. In examples discussed herein, the object, a vehicle, is assumed to be supported by a roadway or other surface such as a parking deck or lot that is a plane parallel to the x and y axes and the roll and pitch rotations are therefore assumed to be zero. A 4DoF pose for a vehicle supported by a planar surface includes values for x, y, z, and yaw, where yaw is an angle in the plane defined by the x and y axes. Techniques discussed herein improve training of a first DNN 800 to determine a 4DoF pose for a vehicle by annotating RGB image data using 4DoF data acquired from a range image acquired by an RGB-D camera.

Typically, a large number of annotated visual or range images can be required to train a DNN to detect objects for vehicle guidance. Annotated visual or range images are images that include data regarding an identity and location of objects included in the visual or range images. Annotating visual or range images can require many hours of user input and many hours of computer time. For example, some training datasets include millions of images and can require millions of hours of user input and computer time. Techniques discussed herein improve training of DNNs to identify and locate objects by acquiring registered visual and range image data and using the range image data to provide ground truth for training the DNN. The range image data provides ground truth data to train the DNN without requiring annotation of the visual or range image data, thereby reducing the time and computer resources required to produce a training dataset for training a DNN. Ground truth refers to data that can be used to determine the correctness of a result output from a DNN acquired from a source independent from the DNN. Annotating RGB image data in this fashion can provide a large number (greater than thousands) of annotated RGB images for training a DNN without requiring manual annotation, thereby saving computer resources and time.

The output and converted 4DoF pose can be input to an image rendering software program, for example, UnReal Engine, available from Epic Games, Cary, NC 27518, along with a 3D model of the vehicle to generate a rendered depth image that includes a 3D rendering of a vehicle at the input 4DoF pose. The 3D model of the vehicle can be based on computer aided design (CAD) data for the vehicle, discussed in relation to FIG. 10, below or can be generated by scanning the vehicle with a lidar scanner, discussed in relation to FIG. 9, below, to generate the 3D model data. The 3D model data is rotated and translated using the rotation and translation matrices and the 3D model is rendered by the rendering software to generate an image that includes a rendered version of the 3D model at the image coordinates corresponding to the 4DoF pose. A rendered binary image can be generated by thresholding the rendered depth image.

The rendered binary image can be compared to a stitched binary image, e.g., generated according to the techniques discussed above in relation to FIGS. 3-7, to determine a loss function for training the first DNN 800. The comparison between the rendered binary image and the stitched binary image can be determined by determining differences in locations of the vehicles in the stitched binary image and the rendered binary image using L1 metrics, chamfer distance, centroid distance, or a combination of these measures. An L1 metric measures the vector distance between two binary images by summing the x and y distances between corresponding pixels of each image. This is also sometimes referred to as "Taxicab" distance. A chamfer distance weights the distance between corresponding pixels in the two binary images by weighting the distance, e.g., the greater the distance, the larger the weight. A centroid distance finds a center for the areas corresponding to the "1" pixels in the stitched binary image and the rendered binary image and measures the distance between the centers. The differences between the stitched binary image and the rendered binary image determines the loss function to be backpropagated through the layers of the first DNN 800. Backpropagation is a technique for transmitting a loss function from the last layers of a first DNN 800 to the first layers and selecting weights for each layer based on minimizing the loss function while processing the same input data a plurality of times while varying the weights.

Techniques discussed herein which determine the loss function from rendered 4DoF poses and stitched images are differentiable. Differentiable means that the functions used to determine the loss functions have partial derivatives with respect to the weights used to determine the 4DoF poses by the first DNN 800. This means that, for a given loss function, a direction in which to change the weights for the next processing iteration that will reduce the loss function can be determined. In this fashion, over a plurality of processing iterations, weights can be determined that cause the loss functions to converge to a minimal value, thereby training the first DNN 800.

Figure 9:
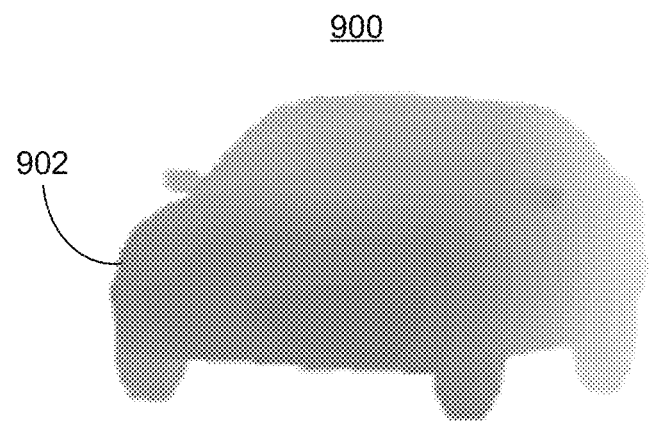
FIG. 9 is a diagram of an example three-dimensional model of a vehicle.

FIG. 9 is a diagram of a 3D model 900 of a vehicle 902 generated by scanning a real-world vehicle with a lidar scanner, for example. The 3D model 900 can be input to an image rendering software program and rotated, translated, and scaled according to a 4DoF pose to produce a rendered, top-down depth image of the vehicle 902. A rendered binary image of the vehicle 902 can be produced by thresholding the rendered, top-down depth image of the vehicle 902. The rendered binary image of the vehicle 902 can be compared to a stitched binary image based on a stitched depth image of the same type of vehicle acquired by an RGB-D camera 150 to form a loss function for training a first DNN 800.

Figure 10:
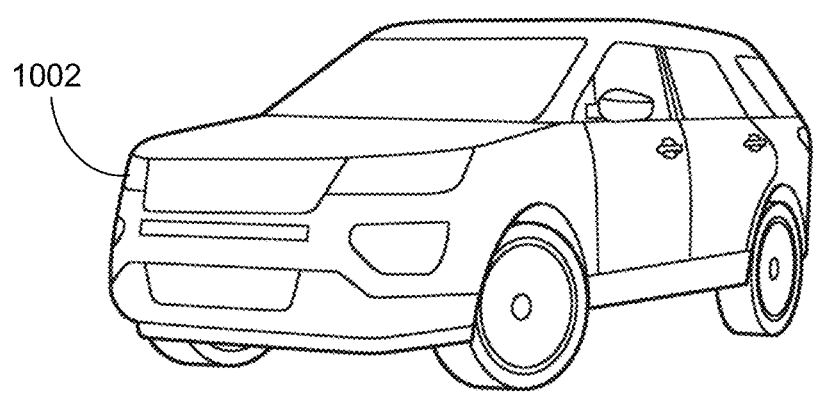
FIG. 10 is a diagram of an example computer aided design model of a vehicle.

FIG. 10 is a diagram of a CAD drawing 1000 of a vehicle 1002. A CAD drawing 1000 is a rendering based on CAD data corresponding to a vehicle 1002. The CAD data corresponding to a vehicle 1002 includes the locations, orientations, and textures of the surfaces that make up a vehicle 1002. The CAD data can be input to a rendering software program to produce a rendered top-down depth image. A rendered binary image can be generated by thresholding the rendered top-down depth image. The rendered binary image can be compared to a stitched binary image based on a stitched depth image of the same type of vehicle acquired by an RGB-D camera 150 to form a loss function for training a first DNN 800.

Figure 11:
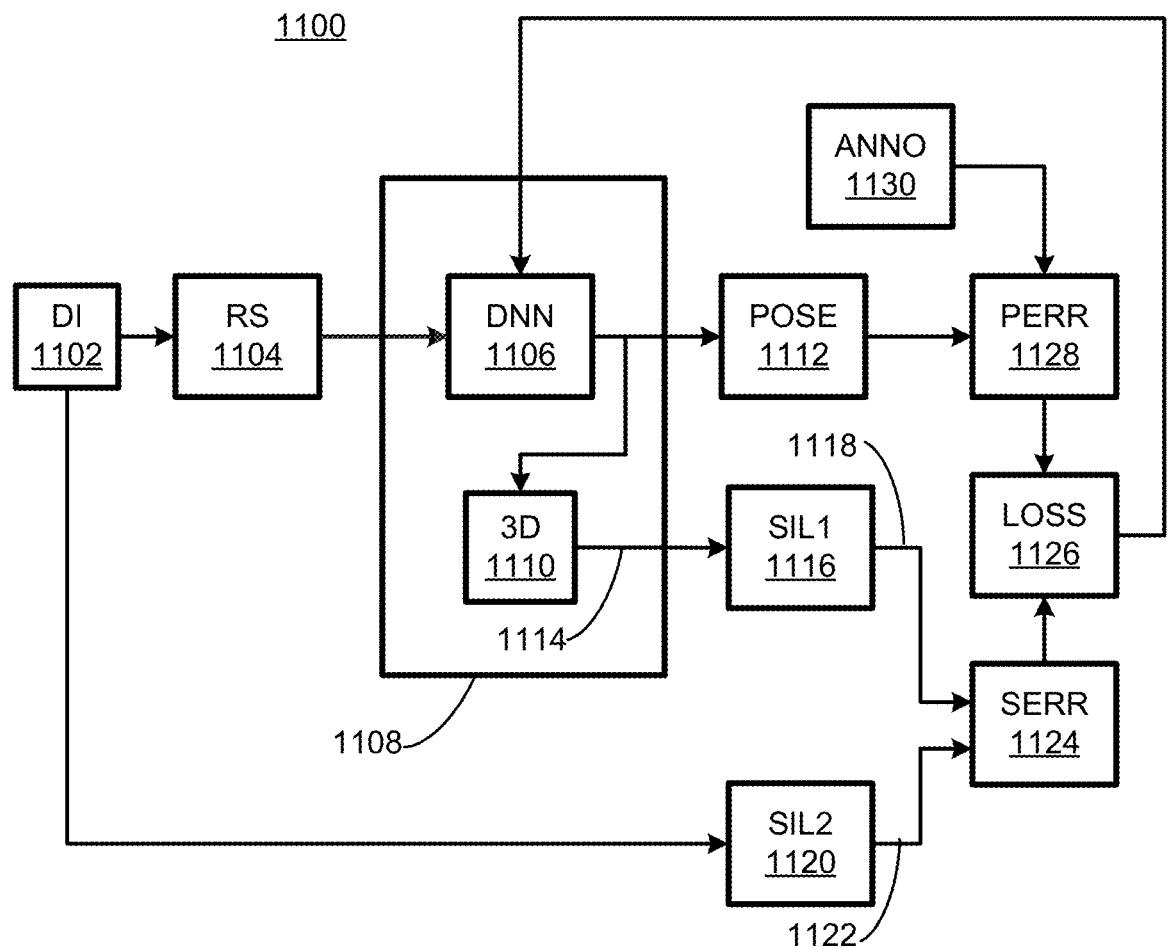
FIG. 11 is a diagram of an example self-supervised training system.

FIG. 11 is a diagram of a self-supervised training system 1100 for training a DNN 1106 to determine a 4DoF pose based on stitched depth image 1102 input. A self-supervised training system 1100 is a software program executing on a remote server computer 140 included in a traffic infrastructure system 100. Self-supervised training system 1100 inputs a stitched depth image (DI) 1102 acquired by a depth generating sensor, for example an RGB-D camera 150. The stitched depth image 1102 is first input to a resize program (RS) 1104 that reduces a high-resolution stitched depth image 1102, for example, 1K×1K pixels (1000 pixels by 1000 pixels), to a lower resolution, for example, 256×256 pixels. The lower resolution stitched depth image is input to a DNN (DNN) 1106, also referred to herein as SiriusNet 1106. DNN or SiriusNet 1106 is included in SiriusRenderNet 1108 along with a 3D model renderer (3D) 1110. DNN or SiriusNet 1106 inputs a low-resolution stitched depth image and outputs an estimated 4DoF pose (POSE) 1112 as ($\hat{x}$, $\hat{y}$, $\hat{z}$, yâw). The estimated 4DoF pose 1112 is input to the 3D model renderer 1110 along with a 3D model of a vehicle, which can be the same make and model vehicle as was imaged by RGB-D camera 150 to form the stitched depth image 1102. The 3D model renderer 1110 generates the rendered depth image 1114 at the same high-resolution as the original input stitched depth image 1102.

The 3D model renderer 1110 outputs a rendered depth image to a first silhouette program (SIL1) 1116 which thresholds the rendered depth image to form a first binary image 1118. The input stitched depth image 1102 is passed to a second silhouette program (SIL2) which thresholds the stitched depth image 1102 to form a stitched binary image 1122. The two binary images 1118, 1122 are input to silhouette error program (SERR) 1124 to measure the distance between the two binary images 1118, 1122 to generate a binary silhouette error according to the equation:

$$\text{error}_{silhouette} = f_{dmap\_distance}(\text{Silhouette}_{rendered})\text{Silhouette}_{depth}) \quad (1)$$

where $f_{dmap\_distance}$ is based on one or more of L1 distance, chamfer distance, and centroid distance as discussed above in relation to FIG. 8. The silhouette error is passed to a loss function (LOSS) 1126 which generates a loss value to be returned to DNN or SiriusNet 1106 where it is backpropagated to determine weights by minimizing the loss value.

Figure 12:
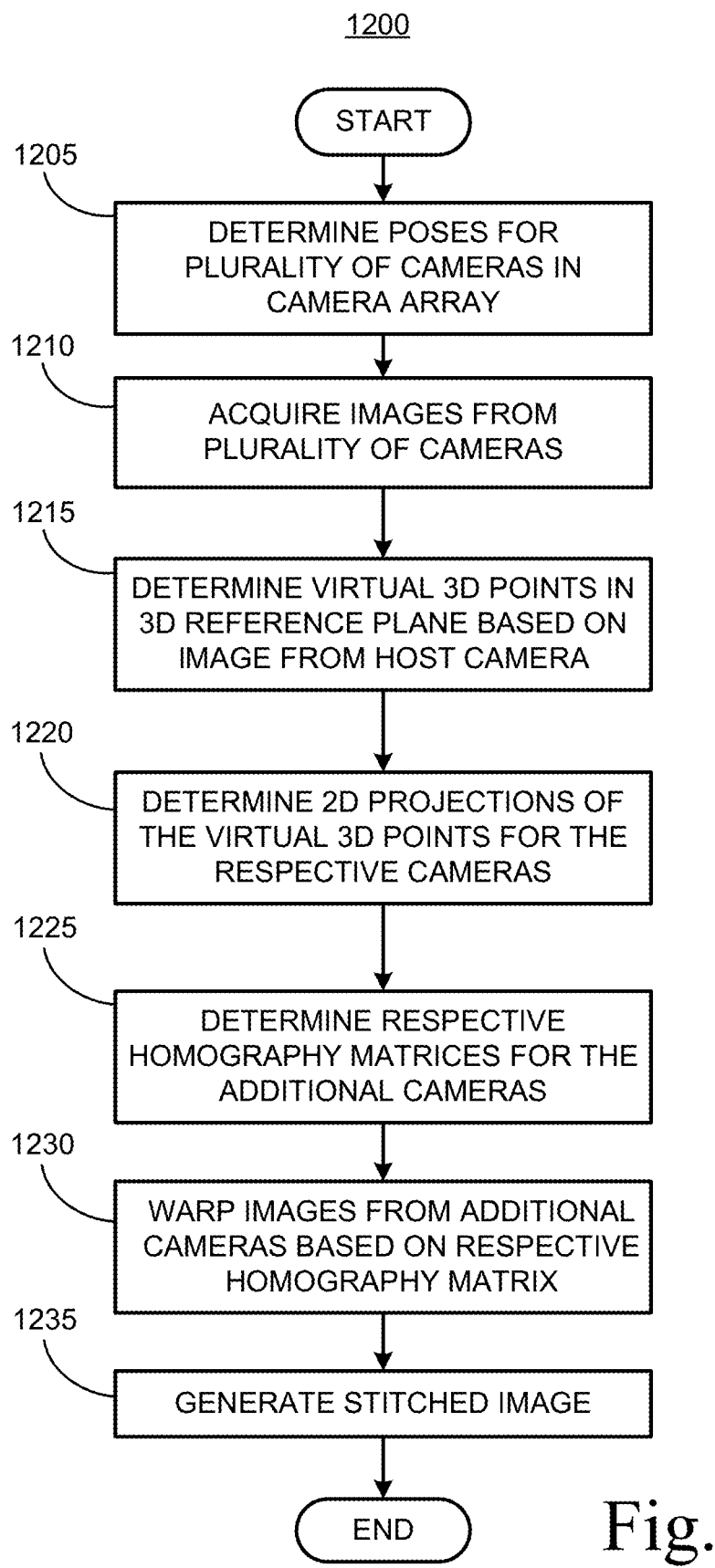
FIG. 12 is a flowchart diagram of an example process to generate a stitched image.

FIG. 12 is a diagram of an example process 1200 executed in a remote server computer 140 according to program instructions stored in a memory thereof for generating a stitched image 700 from respective images 602, 604, 606, 608 acquired by a plurality of cameras 150 and respective homography matrices for the additional cameras 154. Process 1200 includes multiple blocks that can be executed in the illustrated order. Process 1200 could alternatively or additionally include fewer blocks or can include the blocks executed in different orders.

Process 1200 begins in a block 1205. In the block 1205, the remote server computer 140 determines respective 6DoF poses for the plurality of cameras 150. As discussed above, the cameras 150 are arranged in a remote camera array 145 to acquire images of an operating area 200. The plurality of cameras 150 include a host camera 152 and one or more additional cameras 154. The remote server computer 140 can determine the respective 6DoF poses for the cameras 150 based on a 6DoF pose for a fiducial marker 310 and a 6DoF pose for the respective camera 150 relative to the fiducial marker 310, as discussed above in relation to FIG. 4. The process 1200 continues in a block 1210.

In the block 1210, the remote server computer 140 receives respective images 602, 604, 606, 608 from the plurality of cameras 150. The images 602, 604, 606, 608 include at least a portion of a vehicle 105. As set forth above, the images may be RGB images, depth images registered with RGB images, and/or binary images generated by thresholding the depth images. The process 1200 continues in a block 1215.

In the block 1215, the remote server computer 140 determines a 3D reference plane 500 based on a depth image acquired by the host camera 152, as discussed above in relation to FIG. 5A. As set forth above, the 3D reference plane 500 can be defined by one of a ground surface or a surface of the vehicle 105, e.g., a hood, a roof, etc. The remote server computer 140 then randomly selects a plurality of virtual 3D points 502 in the 3D reference plane 500, as discussed above in relation to FIG. 5B. The process 1200 continues in a block 1220.

In the block 1220, the remote server computer 140 determines 2D projections 612 of the virtual 3D points 502 for the respective additional cameras 154. That is, the remote server computer 140 renders the selected virtual 3D points 502 in a 2D plane 614 based on a 6DoF pose for the respective additional cameras 154, as discussed above in relation to FIG. 7. The process 1200 continues in a block 1225.

In the block 1225, the remote server computer 140 computes respective homography matrices for the additional cameras 154. As set forth above, a homography matrix specifies a mathematical relationship between pixel coordinates in one image and pixel coordinates in another image. That is, the homography matrix can be used to transform pixel coordinates from a pixel coordinate system defined by one camera 150 to a pixel coordinate system defined by another camera 150. The remote server computer 140 computes the respective homography matrices for transforming the 2D projections 612 for the respective additional cameras 154 to the 2D projections 612 for the host camera 152, as discussed above in relation to FIG. 7. The process 1200 continues in a block 1230.

In the block 1230, the remote server computer 140 warps respective, e.g., RGB, depth, and/or binary, images 604, 606, 608 acquired by the additional cameras 154 based on the respective homography matrices for the additional cameras 154. That is, the remote server computer 140 transforms the pixel coordinates for the respective images 604, 606, 608 to pixel coordinates for the image 602 acquired by the host camera 152, i.e., a pixel coordinate system defined by the host camera 152, as discussed above in relation to FIG. 8. The process 1200 continues in a block 1235.

In the block 1235, the remote server computer 140 generates a stitched, e.g., RGB, depth, and/or binary, image 700 by aligning the 2D projections 612 in the respective warped images 604, 606, 608 with the 2D projections in the image 602 acquired by the host camera 152, as discussed above in relation to FIG. 8. Additionally, the remote server computer 140 can update respective 6DoF poses for the additional cameras 154 by applying optimization techniques that optimize extrinsic calibration parameters for the additional cameras 154 to reduce a reprojection error E in the stitched image 700, as discussed above. The process 1200 ends following the block 1235.

Figure 13:
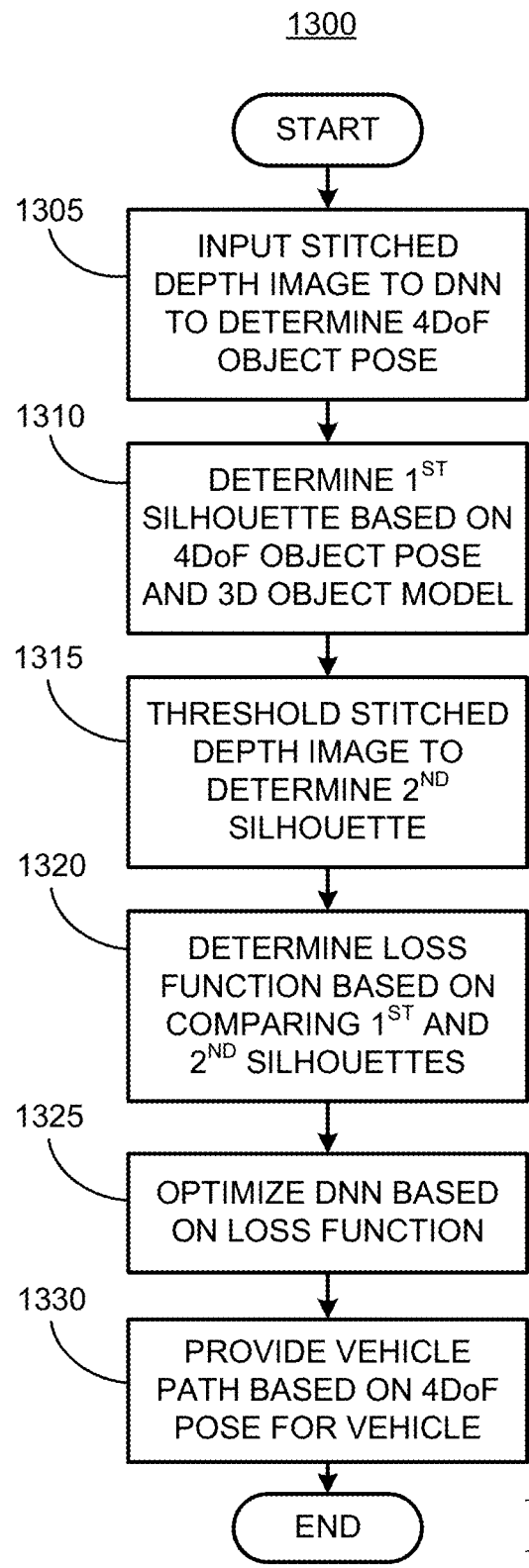
FIG. 13 is a flowchart diagram of an example process to train a deep neural network.

FIG. 13 is a diagram of an example process 1300 executed in a remote server computer 140 according to program instructions stored in a memory thereof for training a first DNN 800 based on stitched depth images 1102. Process 1300 includes multiple blocks that can be executed in the illustrated order. Process 1300 could alternatively or additionally include fewer blocks or can include the blocks executed in different orders.

Process 1300 begins in a block 1305. In the block 1305, the remote server computer inputs a stitched depth image 1102 (e.g., generated according to the process 1200) to a DNN or SiriusNet 1106 to determine a 4DoF pose of an object included in the stitched depth image 1102, as discussed above in relation to FIG. 11. The object can be a vehicle 105, for example. The process 1300 continues in a block 1310.

In the block 1310, the remote server computer 140 determines a first silhouette image by inputting the 4DoF pose of the object into a 3D rendering program along with a 3D model of the object to determine a rendered depth image of the object. For example, the 3D model can be CAD data regarding the particular make and model of vehicle included in the stitched depth image 1102 input to the DNN 1106 in the block 1302. The first silhouette image can be determined by thresholding the rendered depth image based on a user determined threshold, as discussed above in relation to FIG. 11. The process 1300 continues in a block 1315.

In the block 1315, the remote server computer 140 thresholds the stitched depth image 1102 based on a user determined threshold to determine as second silhouette image, as discussed above in relation to FIG. 11. The process 1300 continues in a block 1320.

In the block 1320, the remote server computer 140 compares the first silhouette image with the second silhouette image to determine a loss function, as discussed above in relation to FIG. 11. The process 1300 continues in a block 1325.

In the block 1325, the remote server computer 140 trains the DNN 1106 based on the loss function. The loss function can be backpropagated through the DNN 1106 layers to determine weights that yield a minimum loss function based on processing the input stitched depth image a plurality of times and determining a loss function for each processing iteration. Because the steps used to determine the loss function are differentiable, the partial derivatives determined with respect to the weights can indicate in which direction to change the weights for a succeeding processing iteration that will reduce the loss function and thereby permit the training function to converge, thereby optimizing the DNN 1106. The process 1300 continues in a block 1330.

In the block 1330, the remote server computer 140 provides a vehicle path 210 to a vehicle computer 110 in a vehicle 105. The remote server computer 140 can input stitched depth images 1102 to the trained DNN 1106, and the trained DNN 1106 can output 4DoF poses 1112 for the vehicle 105 operating in an operating area 200. The remote server computer 140 can process the 4DoF poses 1112 to determine a plurality of locations, referred to herein as "breadcrumbs" that are included in the vehicle path 210. That is, the remote server computer 140 can determine the vehicle path 210 based on the output 4DoF poses 1112 for the vehicle 105. A vehicle path 210 can be determined based on the "breadcrumbs" by determining a polynomial function that iterates through the "breadcrumbs", for example. The remote server computer 140 can transmit the vehicle path 210 to the vehicle computer 110, e.g., via V-to-I communications, the network 135, etc. The vehicle path 210 can be used by the vehicle computer 110 to operate the vehicle 105 by controlling one or more of vehicle components 125 to cause the vehicle 105 to travel along the vehicle path 210. Following block 1330 process 1300 ends.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising a computer including a processor and a memory, the memory storing instructions executable by the processor to:
   randomly select a plurality of virtual three-dimensional points distributed on a 3D reference plane for a camera array including a plurality of cameras, the plurality of cameras including a host camera and one or more additional cameras;
   determine respective two-dimensional projections of the plurality of virtual 3D points for the plurality of cameras based on respective poses of the cameras;
   determine, for the respective one or more additional cameras, respective homography matrices based on the 2D projections for the respective camera and the 2D projections for the host camera, wherein the respective homography matrices map the 2D projections for the respective camera to the 2D projections for the host camera; and
   generate a stitched image based on respective images captured by the plurality of cameras and the respective homography matrices.

2. The system of claim 1, wherein the instructions further include instructions to input the stitched image into a neural network that outputs a pose of an object included in the stitched image.

3. The system of claim 2, wherein the pose of the object is determined in coordinates of a real-world coordinate system based on orthogonal x, y, and z axes and a yaw rotation about the z axis.

4. The system of claim 2, wherein the object is a vehicle, and wherein the instructions further include instructions to generate a path for the vehicle based on the determined pose.

5. The system of claim 4, wherein the instructions further include instructions to operate the vehicle along the generated path.

6. The system of claim 2, wherein the instructions further include instructions to:
   determine a first 2D silhouette of the object based on inputting the pose of the object and a 3D model of the object to a silhouette rendering program;
   determine a second 2D silhouette of the object based on the stitched image; and
   train the neural network based on a difference between the first 2D silhouette and the second 2D silhouette.

7. The system of claim 1, wherein the instructions further include instructions to determine respective poses of the plurality of cameras based on calibration images captured by the respective cameras and including a fiducial marker.

8. The system of claim 1, wherein the poses of the respective cameras are determined in coordinates of a real-world coordinate system based on orthogonal x, y, and z axes and roll, pitch, and yaw rotations about the x, y, and z axes, respectively.

9. The system of claim 1, wherein the instructions further include instructions to determine update poses for respective cameras based on a reprojection error in the stitched image.

10. The system of claim 1, wherein the 3D reference plane is defined by one of a ground surface or a surface of an object.

11. The system of claim 1, wherein the images are time-synchronized.

12. The system of claim 1, wherein the plurality of cameras are red-green-blue-depth (RGB-D) cameras.

13. A method, comprising:
   randomly selecting a plurality of virtual three-dimensional points distributed on a 3D reference plane for a camera array including a plurality of cameras, the plurality of cameras including a host camera and one or more additional cameras;

determining respective two-dimensional projections of the plurality of virtual 3D points for the plurality of cameras based on respective poses of the cameras;

determining, for the respective one or more additional cameras, respective homography matrices based on the 2D projections for the respective camera and the 2D projections for the host camera, wherein the respective homography matrices map the 2D projections for the respective camera to the 2D projections for the host camera; and generating a stitched image based on respective images captured by the plurality of cameras and the respective homography matrices.

14. The method of claim 13, further comprising inputting the stitched image into a neural network that outputs a pose of an object included in the stitched image.

15. The method of claim 14, wherein the pose of the object is determined in coordinates of a real-world coordinate system based on orthogonal x, y, and z axes and a yaw rotation about the z axis.

16. The method of claim 14, wherein the object is a vehicle, and further comprising:

generating a path for the vehicle based on the determined pose; and operating the vehicle along the generated path.

17. The method of claim 14, further comprising:

determining a first 2D silhouette of the object based on inputting the pose of the object and a 3D model of the object to a silhouette rendering program;

determining a second 2D silhouette of the object based on the stitched image; and training the neural network based on a difference between the first 2D silhouette and the second 2D silhouette.

18. The method of claim 13, further comprising determining respective poses of the plurality of cameras based on calibration images captured by the respective cameras and including a fiducial marker.

19. The method of claim 13, wherein the poses of the respective cameras are determined in coordinates of a real-world coordinate system based on orthogonal x, y, and z axes and roll, pitch, and yaw rotations about the x, y, and z axes, respectively.

20. The method of claim 13, further comprising determining updated poses for respective cameras based on a reprojection error in the stitched image.

* * * * *